Patented Apr. 8, 1941

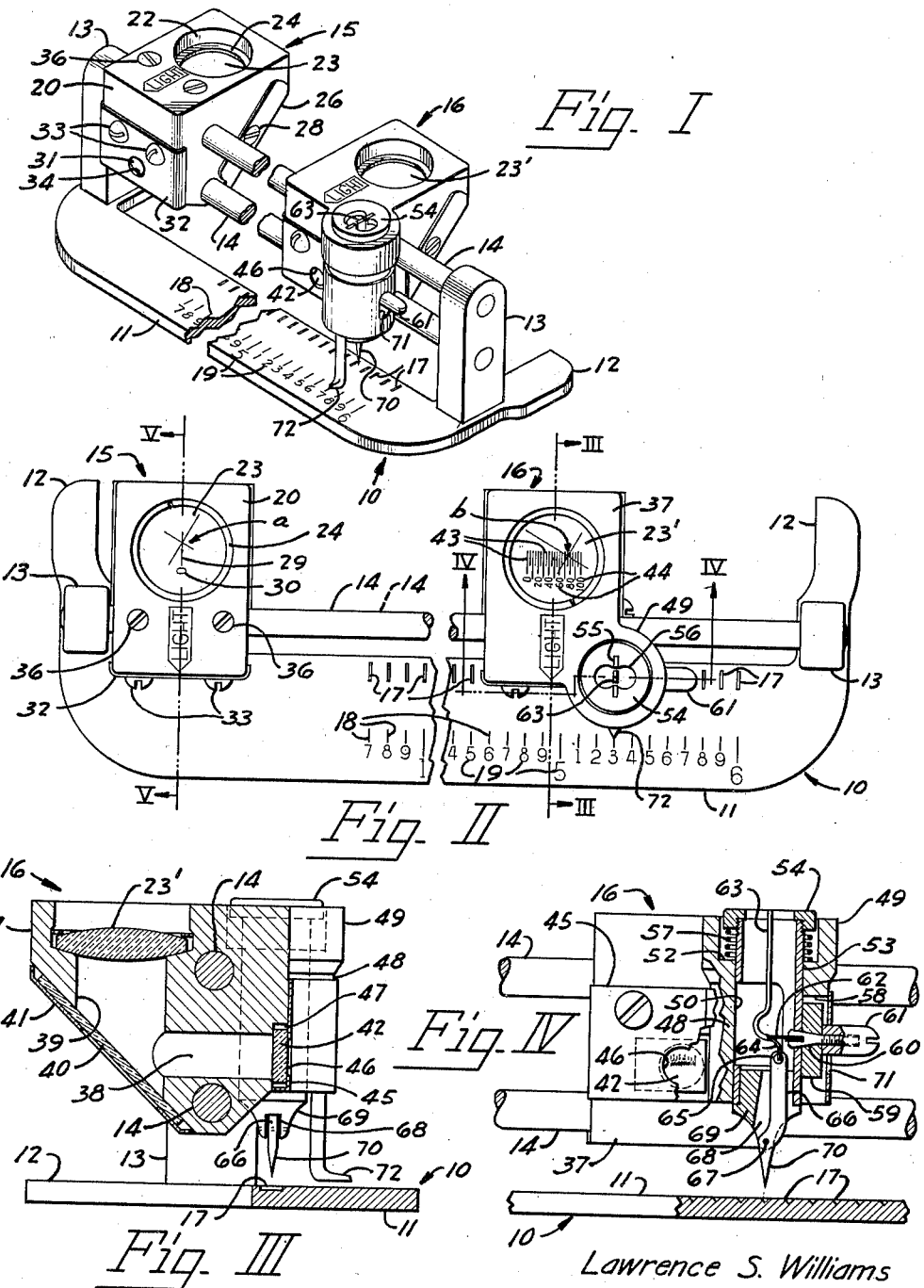

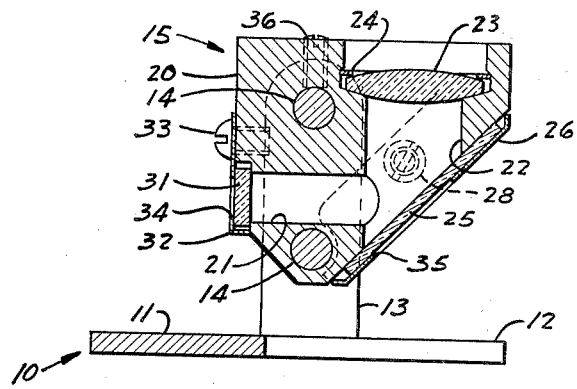
*Fig. V*
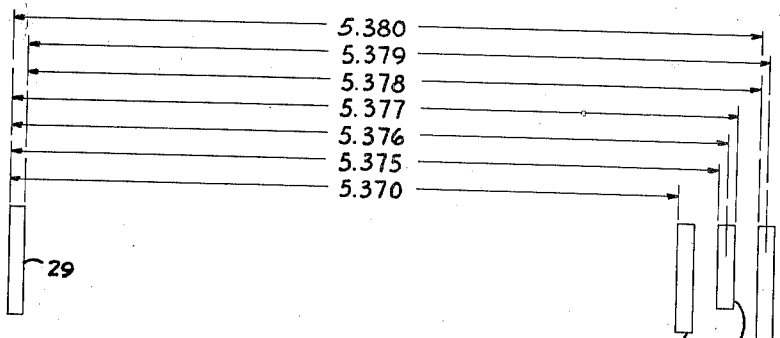
*Fig. VI*

2,237,515

UNITED STATES PATENT OFFICE 2,237,515

MEASURING INSTRUMENT

Lawrence S. Williams, Toledo, Ohio, assignor to Toledo Scale Company, Toledo, Ohio, a corporation of New Jersey Application December 18, 1939, Serial No. 309,708

6 Claims. (Cl. 33—125)

This invention relates generally to measuring devices, and more particularly to measuring devices for accurately determining the distance between two spaced points. In "laying out" workpieces, that is marking the centers for holes to be drilled or bored, determining distances for other operations or for checking the same after they are "laid out" it was heretofore necessary to resort to manually set micrometers, vernier gauges or other precision instruments. The use of such instruments, however, is time consuming, they require a great deal of skill and unless great care is taken the operator may easily misread the setting of the instrument or make mistakes in setting dividers or calipers used in transferring such determined dimension to the workpiece.

The device illustrated and described in the instant application is a modification of that illustrated and described in my copending application Serial No. 303,735, filed November 10, 1939, for Measuring devices. Whereas the device illustrated and described in the copending application utilizes an elongated stationary translucent scale along which a magnifier is movable, the instrument illustrated and described in the instant application utilizes a short translucent scale which is movable with a magnifier and has means for accurately locating the short scale in selected positions.

The principal object of this invention is the provision of improved means for determining the distance between two points in which such measurement is directly and visually indicated.

Another object is the provision of an improved measuring device in which a fiducial mark and a mark whose distance is to be determined is made to appear in coincidence with brilliantly illuminated scale markings which apparently lie upon the surface of the object being measured.

Another object is the provision of a measuring instrument which is compact, portable, relatively inexpensive to produce and capable of being utilized by persons having only ordinary mechanical skill.

Still another object is the provision of improved means by means of which an object to be measured can be viewed in unobscured detail in conjunction with a pair of measuring scales.

A still further object is the provision of an improved measuring device having an optical initial or fiducial mark, an optically magnified measuring scale and means for positively setting the optically magnified measuring scale selectively into definite predetermined relation to the fiducial mark.

These, and other objects and advantages will be apparent from the following description in which reference is had to the accompanying drawings, illustrating preferred embodiments of the invention and in which similar reference numerals refer to similar parts throughout the several views.

In the drawings—

Fig. I is a perspective view of a preferred form of a device embodying the invention, a portion thereof being broken away.

Fig. II is a plan view thereof.

Fig. III is an enlarged sectional side elevational view through the device substantially along the line III—III of Fig. II.

Fig. IV is an enlarged sectional front elevational view through the mechanical indexing means substantially along the line IV—IV of Fig. II.

Fig. V is an enlarged sectional side elevational view through the device substantially along the line V—V of Fig. II; and, Fig. VI is a diagram illustrating the manner of determining dimensions to within .001".

Referring to the drawings in detail:—

The device is mounted upon a base 10 which, in the embodiment shown, is a rigid metal plate comprising a longitudinally extending portion 11 and rearwardly extending projections 12 that act as stabilizing feet when the device is in use. Extending upwardly from each of the portions 12 are posts 13. These posts are provided with horizontally aligned holes in which guide rods 14 are positioned and suitably fastened. These rods span the space between the posts 13 and extend through accurately spaced and aligned holes in a pair of optical units 15 and 16. Closely adjacent the rear edge of the longitudinally extending portion 11 the base 10 is provided with a series of accurately spaced, sharply defined V notches 17 which may be engraved or stamped. These notches may be spaced according to units of any system of mensuration and in the instant embodiment represent tenths of inches. A series of graduations 18 and designating numerals 19 are marked along the forward edge of the longitudinal portion 11 of the base 10. Each of these graduations is in alignment with one of the notches 17 and thus the numerals 19 designate the value of the notches 17 as well as of the graduations 18.

The optical unit 15 comprises a body 20 which may be die-cast or otherwise formed of metal or synthetic plastic material and is in the shape of a substantially rectangular block through which the previously mentioned holes extend for mounting this unit upon the guide rods 14. A horizontally extending passage 21 in the body terminates in a vertical passage 22 in the upper mouth of which is mounted a magnifying lens 23 resting upon a shoulder and retained therein by a split resilient ring 24. The axes of the passages 21 and 22 intersect and are perpendicular to each other. The bottom of this block, from a short horizontal portion which is centrally offset, diverges upwardly in opposed directions at angles of approximately 45 degrees. A transparent mirror 25 is secured to the rearwardly diverging face by means of a bezel 26, having upwardly-turned ends, which straddle the body 20 and are fastened thereto by screws 28. The mirror 25 is provided with a very thin metallic coating, such as silver or aluminum, which is not sufficient to materially reduce the transparency of the mirror. This coating which faces the passage 21, however, is sufficiently intense to reflect a brightly illuminated image of a zero or fiducial mark 29 and a designating zero numeral 30, which are formed by transparent areas on a translucent plate 31, seated in a recess in the body 20 surrounding the mouth of the passage 21. This plate is preferably produced as a photographic negative, and it is retained in this recess by means of a bezel 32 which is fastened to the body 20 by means of screws 33. An aperture 34 in this bezel is in alignment with the passage 21. The bezel 26, which retains the transparent mirror 25, is also provided with an aperture 35 in alignment with the passage 22.

The optical unit 15 is fixedly locked to the rods 14 by set screws 36 which are threaded through the body 20 and it is positioned on the rods 14 so that the zero mark 29 is spaced a predetermined distance from the first left-hand graduation 18 of the series so that it forms the zero graduation of this series.

The optical unit 16, which is slidably mounted upon the rods 14, is substantially similar in construction to the unit 15. It comprises a body 37, a horizontally extending passage 38, a vertically extending passage 39 and suitably spaced apertures for mounting it upon the rods 14.

A transparent mirror 40, which is a duplicate of the mirror 25, is secured to the upwardly slanting face of the body by means of a bezel 41. It is also provided with a translucent plate 42 seated in a recess 47, over the mouth of the passage 39 and retained therein by a bezel 45 which has an aperture 46 in alignment with this passage. In place of the single mark 29 and its designating numeral 30, the plate 42 has a series of transparent graduations 43 and identifying numerals 44.

The graduations 43 represent subdivisions of the distance between two of the notches 17 as indicated by the graduations 18 and numerals 19. Since in this embodiment the distance between two of the notches is one-tenth of an inch the length of the series of graduations 43 is also .1" and is graduated by .005".

The optical unit 16 is provided with means for accurately positioning it on the rods 14 so that the zero graduation 43, of the series on the plate 42, is spaced a definite distance from the mark 29 on the plate 31 in the fixed optical unit 15. To accomplish this, the body 37 of the optical unit 16 is provided with a cylindrical boss 48 having an enlarged head 49 (Figs. II and III).

A bore 50 extends through the boss 48 and its head 49; however, that portion of the bore which extends through the enlarged head 49 is counterbored so that a shoulder 52 is formed. Slidably seated in this bore 50 is an indicator tube 53 on the upper end of which is threaded a perforated cover 54 having an engraved mark 55 extending on both sides of a perforation 56. A compression spring 57, circumjacently mounted upon the tube 53 between the shoulder 52 and the undersurface of the extending rim of the cover 54, serves to reposition this tube longitudinally in the body of the unit when displaced.

To prevent rotation of the indicator tube 53, about its longitudinal axis in the bore 50, a block 58 is fastened to the tube 53 by means of a screw 60. This block is slidably positioned in a slot 58 milled laterally through the tube-like portion formed by the bore 50 and the outer wall of the cylindrical boss. The block 59 has a concave face to fit the periphery of the tube 53 and the screw 60 has a conical head, a portion of which is seated in aligned conically reamed holes in the tube and in the block, the threaded body of this screw extends through the block and is engaged by an elongated draw-nut 61 extending beyond the cylindrical boss 48 forming a handle for moving the indicator tube 53 in the bore 50 for a reason that will later become apparent. The conical head, a portion of which extends into the interior of the indicator tube 53, however performs another function, it is provided with a horizontally disposed slot and one end of a small flexure plate 62 extends into this slot and is tightly gripped when the conical head of the screw 60 is drawn inwardly by tightening the draw-nut 61. The other end of the flexure plate 62 is gripped between the folded sides of a punched and formed sheet metal indicator 63.

The indicator 63 has a downwardly extending finger 64 formed by a single thickness of the sheet from which it is formed and the lower end of this finger enters a slotted hole 65 in the upper end of a positioning lever 66 which is pivoted on a pintle 67 extending through a slot 68 in a cylindrical plug 69 driven into the lower end of the indicator tube 53. The positioning lever 66, which is preferably made of tool steel and hardened, has a sharply pointed spur 70, extending below its fulcrum on the pintle 67, for cooperation with any one of the notches 17 in the base 10, in a manner which later will become clear. The upper end of the punched and formed indicator 63 when properly assembled is flush with the upper surface of the cover 54 and is normally positioned in coincidence with the mark 55 on the upper surface of the perforated cover 54.

The bezel 45, which retains the translucent plate 42 in the recess 47, is formed to snugly fit the cylindrical boss 48 and serves to enhance the appearance of the unit 16. An elongated slot 71 is provided in this bezel through which the handle-like draw-nut 61 projects.

In the optical units 15 and 16 the several optical components are so calculated and designed that that perpendicular distance from any point on the plates 31 or 42, which carry the graduations 29 or 43 respectively, to a point on the reflecting surface of the transparent mirrors 25 or 40 is the same as the distance from that point on the mirror to the plane of the flat bottom of the base 10; hence, if the device is standing upon a flat surface the reflected images of the graduations 29 or 43 when viewed through the magnifying lenses of the units appear to lie upon the flat surface that supports the device and the graduations and any markings upon the surface upon which the device stands are magnified to the same extent by the lenses. A slight diminution of light from below the mirror as the light is transmitted through its reflecting surface emphasizes the contrast between the image of the graduations and the field.

Assuming that it is desired to locate the centers of two holes *a* and *b* (Figure II) which are to be bored or drilled in a plate or other work-piece exactly 5.375" apart, the operator first establishes the center of the first hole *a* and then places the device embodying the present invention so that the reflected image of the zero or fiducial mark 29, when viewed through the lens 23 of the unit 15, overlies this center. Since the image of this mark, reflected on the transparent mirror when viewed through the lens 23, appears to lie on the surface of the work-piece the device may be positioned with great accuracy and without parallax. The unit 16 is then moved on the rods 14 until an index 72 indicates or is in registration with that graduation 18 which represents the desired dimensions in inches and tenths of inches. In the present example, the index is positioned to point to 5.3" as identified by the numerals 19. Since it is impossible for the operator to position the unit 16 within a thousandth of an inch the positioning means previously described are now employed. The operator places his finger upon the protruding handle formed by the draw-nut 61 and gently presses the indicator tube 53 with the mechanism assembled therein downwardly until the spur 70 enters the proper V notch 17. If the unit 16 is not properly positioned the point of the spur 70 engages the tapering surface of one of the walls forming the notch, continued downward movement turns the lever 66 about its fulcrum on the pintle 67 thus causing the indicator 63 to turn about its fulcrum, formed by the flexure plate 62, and the other end of this indicator will move in the perforation 56 away from the mark 55 on the cover 54 and thus notify the operator of the device that the unit 16 is not yet properly positioned. It is apparent that the direction of movement of the indicator 63 indicates in which direction the unit must be moved. After releasing the pressure on the handle 61 the bias of the spring 57 returns the indicator tube into its initial position, the operator then moves the unit in the proper direction and repeats the operation and continues to do so until the end of the indicator 63 remains in registration with the mark 55 when the spur engages the apex of the notch 17 thus informing the operator that the unit is now properly positioned with respect to the center of the notch 17. At this time the zero graduation of the series 43, when viewed through the lens 23' of the unit 16, is spaced exactly 5.3" from the zero or fiducial mark 29 as viewed through the lens 23 of the unit 15 and the final fraction of the desired distance can now be estimated from the reflected and magnified image of the series of graduations 43 which represent the subdivisions of a tenth of an inch. Although the markings on the plate 42 each represent five-thousandths of an inch dimensions to one-thousandth of an inch are definitely determinable. This, however, requires that the width of each of the graduations 29 and 43 be exactly two-thousandths of an inch and that there be a clear interval of three-thousandths of an inch between the graduations 43.

When the previously mentioned distance of 5.375" is to be determined the device is so positioned that the outer or left-hand edge of the magnified image of the zero graduation 29, when viewed through the lens 23, is in registration with the starting point on the work-piece. This may be a scribed line or a punch mark. After positioning the unit 16, the final fraction is then indicated by the left-hand edge of the proper graduation 43 as is diagrammatically indicated in Fig. VI. Since the width of the graduation is two-thousandths of an inch, a distance of 5.376" is indicated by the center of this graduation which in its magnified condition can be readily estimated and the distance 5.377" by its right-hand edge. To determine 5.378" the device is shifted so that the right-hand edge of the magnified image of the mark 29 is in registration with the aforementioned starting point on the work-piece and without moving the unit 16 the distance is indicated by the left-hand edge of the next adjacent graduation 43 to the right and the distance 5.379" by the center of this graduation as is clearly shown in Fig. VI.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, a base, a series of V notches of substantial depth cut into a surface of said base and spaced to represent equal fractions of units of a system of mensuration, said V notches being V-shaped in cross section as cut by a plane extending along said series and perpendicular to the surface of said base, means on said base for fixedly supporting an optical unit adapted to give a magnified indication of a zero graduation at a predetermined distance from one of said V notches, said means also supporting for sliding movement a second optical unit adapted to give a magnified indication of another mark and manipulative means cooperating with said series of V notches for selectively positioning said second optical unit with respect to one of said V notches, said manipulative means comprising a tube mounted in said second optical unit for longitudinal reciprocating movement, a lever pivotally mounted in said tube and having a spur adapted to enter one of said notches in said base, said lever being adapted to remain immovable when said spur engages the apex of the converging walls forming the V notch and to rock about its fulcrum when said spur strikes one of the converging walls in its downward movement and an indicator pivotally mounted in said tube engaging and actuated by said lever for giving a visual indication of such movement.

2. A device according to claim 1 in which said pivotal mounting of said indicator comprises a flexure plate secured to the interior wall of said reciprocating tube.

3. In a device of the class described, in combination, a base adapted to be positioned upon a surface of an object, an optical unit fixedly mounted on said base and adapted to simultaneously expose a magnified image of a zero mark and a magnified view of a portion of the surface upon which the device is positioned, a second optical unit movably mounted upon said base and adapted to expose a magnified image of a series of graduations including a zero mark and a magnified view of another portion of such object upon which the device is positioned, said series of graduations being carried by said second optical unit, means for positioning said second optical unit so that such magnified image of said zero mark of said series of graduations is located approximately at a predetermined distance from said zero mark exposed by said first optical unit, said positioning means comprising a series of graduations and designating numerals marked on said base and an index on said second optical unit and an indicator for definitely showing when said zero mark of said series of graduations exposed by said second unit is at such predetermined distance from said zero mark exposed by said first optical unit.

4. In a device of the class described, in combination, a base, a series of V notches spaced to represent units of a system of mensuration cut into a surface of said base, a rod mounted upon said base and in spaced relation thereto, an optical unit adapted to give a magnified indication of a zero graduation fixedly mounted upon said rod, a second optical unit slidably mounted on said rod, said second unit being adapted to give a magnified indication of a series of graduations representing subdivisions of one of said units of such system of mensuration and manipulative means on said second optical unit for sensing the alignment of said second optical unit with respect to one of said V notches, said manipulative means including a spur selectively engageable with said notches, and means actuated by said manipulative sensing means for indicating when said sensing means is in exact alignment with one of said V notches.

5. In a device of the class described, in combination, a base, a series of V notches spaced to represent units of a system of mensuration, a rod mounted upon said base and in spaced relation thereto, an optical unit adapted to give a magnified indication of a zero graduation fixedly mounted upon said rod, a second optical unit slidably mounted on said rod, said second unit being adapted to give a magnified indication of a series of graduations representing subdivisions of one of said units of such system of mensuration and manipulative means including a spur selectively engageable with said notches and carried by said second optical unit for sensing the alignment of said second optical unit with respect to one of said V notches.

6. In a device of the class described, in combination, a base, a series of V notches cut in a surface of said base, a rod mounted on said base and in spaced relation thereto, an optical unit fixedly mounted on said rod, a second optical unit slidably mounted on said rod, and means forming a part of said second optical unit and including a spur selectively engageable with said V notches in said base for positioning said second optical unit a definite distance with respect to said fixedly mounted unit.

LAWRENCE S. WILLIAMS.